United States Patent [19]

Radehaus et al.

[11] Patent Number: 5,838,470
[45] Date of Patent: Nov. 17, 1998

[54] OPTICAL WAVELENGTH TRACKING RECEIVER

[75] Inventors: Christian Volker Radehaus, Einsiedel, Germany; Jon Robert Sauer, Superior; Heinz Willebrand, Longmont, both of Colo.

[73] Assignees: University Technology Corporation; by said Jon Robert Sauer and Christian Volker Radehaus; Eagle Optoelectronics, LLC, both of Boulder, Colo.; by said Heinz Willebrand

[21] Appl. No.: 868,980

[22] Filed: Jun. 4, 1997

Related U.S. Application Data

[63] Continuation of Ser. No. 508,027, Jul. 27, 1995, abandoned.

[51] Int. Cl.$^6$ ..................................................... H04J 14/02
[52] U.S. Cl. .......................... 359/124; 359/125; 359/158
[58] Field of Search .................................... 359/115, 118, 359/119, 120, 121, 124, 125, 126, 133, 158, 189, 195

[56] References Cited

U.S. PATENT DOCUMENTS

| | | | |
|---|---|---|---|
| 4,791,630 | 12/1988 | Priatko | 370/3 |
| 4,835,782 | 5/1989 | Kaede et al. | 372/32 |
| 4,965,856 | 10/1990 | Swanic | 455/617 |
| 5,030,824 | 7/1991 | Babbit | 250/277 |
| 5,131,062 | 7/1992 | Eide et al. | 385/12 |
| 5,206,920 | 4/1993 | Cremer et al. | 385/37 |
| 5,400,163 | 3/1995 | Mizuochi et al. | 359/124 |
| 5,410,147 | 4/1995 | Riza et al. | 250/214 |
| 5,436,748 | 7/1995 | Vinel et al. | 359/125 |

OTHER PUBLICATIONS

"Optical Winner–Take–All Neural Net With Memory", Pankove et al., Electronics Letters 15th, vol. 26, Mar. 1990, pp. 349–350.

"Maximum Detection With A 2D Optoelectronic p–n–p–n Winner–Takes–All Network", Radehaus et al., Applied Optics, vol. 31, No. 29, 1992, pp. 6303–6306.

"Technical Applications Of A 2–D Optoelectronic P–N–P–N Winner–Take–All Array", Radehaus et al., Springer Proceedings in Physics, vol. 79, New York, 1995, pp. 250–265.

"A Robust WDM Communication System", Sauer et al., IEEE Lasers and Electro–Optics Society 1994 Proceedings, vol. 2, pp. 99–100.

"Monolithically Integrated DWDM Receiver", Cremer et al., IEEE Proceedings–J, vol. 140, No. 1, Feb. 1993, pp. 71–74.

"WDM Receiver Chip With High Responsivity", Cremer et al., Electronics Letters 15th Sep. 1994, vol. 30, No. 19, pp. 1625–1626.

"2–D WDM Optical Interconnections Using Multiple–Wavelength VCSEL's For Simultaneous and Reconfigurable Communication Among Many Planes", IEEE Photonics Technology Letters, Jul. 1993, vol. 5, No. 7, pp. 838–841.

(List continued on next page.)

*Primary Examiner*—Rafael Bacares

[57] ABSTRACT

An optical receiver suitable for use in a wavelength division multiplexing (WDM) system is able to tolerate shifts in the transmitting lasers' wavelength. During a periodically repeated wavelength synchronization phase, only a single transmitter laser is operating, and a peak finder locks onto the wavelength having greatest power and notes the corresponding detector pixel's position. Thus, the receiver knows the relative wavelength of the transmitting laser in terms of the detector pixel illuminated with the brightest light, and can store this information for later reference. The active transmitter lasers take turns synchronizing their wavelengths during successive synchronization phases. During the multi-wavelength data transmission phase, many lasers in the system transmit information at the same time, at different wavelengths. During this phase, each receiver decodes the input from one or a few selected pixels identified previously during the synchronization phase as being associated with a particular selected transmitter.

21 Claims, 8 Drawing Sheets

OTHER PUBLICATIONS

"WDM–Based Local Lightwave Networks Part 1 Single–Hop Systems", Mukherjee, IEEE Network, May 1992, pp. 12–22.

"Starnet: A Multi–gigabit–per–second Optical LAN Utilizing a Passive WDM Star", Kazovsky et al., Journal of Lightwave Technology., vol. 11, No. 5/6, May/Jun. 1993, pp. 1009–1027.

"Optical Distribution Chanel: An Almost–all Optical LAN based on the Field–coding Technique", Hass et al., IEEE 1992, pp. 57–67.

"Multiwavelength Lightwave Networks for Computer Communication", Ramaswami, IEEE Communications Magazine, Feb. 1993, pp. 78–88.

OPTICAL WAVELENGTH TRACKING RECEIVER

CROSS REFERENCE TO RELATED APPLICATION

This is a continuation of U.S. application Ser. No. 08/508,027 filed Jul. 27, 1995 now abandoned.

U.S. GOVERNMENTAL RIGHTS

Certain aspects of this invention were made with U.S. Government support under SBIR contract DASG-60-94-C-0040 awarded by the U.S. Army Defense and Strategic Space Command. The U.S. Government has certain rights in the invention.

FIELD OF THE INVENTION

This invention relates to an optical transmitter and receiver system suitable for wavelength division multiplexing (WDM). In particular, this invention relates to a system able to tolerate fabrication and operating variations in the transmitting lasers' wavelengths.

BACKGROUND OF THE INVENTION

Wavelength-division multiplexing (WDM) using fiber optic technology is a promising approach to implementing optical broad-band networks, such as local area networks. High aggregate bandwidth is obtained in the form of a large number of independent optical WDM channels operating at various fixed wavelengths. However, up to now, because of the limitations discussed below, WDM systems have been limited to research demonstrations.

In conventional WDM systems each channel is encoded at a predefined wavelength. Each transmitted channel in a spectrum of multiple wavelengths is combined and injected into the fiber. At the receiver end, the spectrum is decomposed into its wavelength constituents by fixed or tunable narrow bandwidth filters for the different wavelength channels. The optical data stream of each wavelength is converted into electrical signals by photo detectors with a high quantum efficiency in the relevant spectral range. However, conventional WDM systems face some major technical problems related to the WDM method they use: current WDM architectures are based on transmitters and receivers that must be precisely tuned to predetermined fixed wavelengths.

Up until now the implementation of WDM architectures in networks has been extremely costly (both in time and dollars). The costs of short haul WDM systems are mainly determined by the costs of the transmitter (laser) sources which are currently very high for high performance systems. This is because the lasers require extremely tight manufacturing tolerances with respect to center wavelength and line width, on the order of a few Angstroms. Much worse is the problem of laser wavelength drift with temperature on the order of 0.5–1 nm per degree C.

Conventional lasers are difficult to control precisely enough to operate as transmitters in a WDM environment. First, laser arrays cannot easily be fabricated to tight enough tolerances so that two different arrays produce close enough wavelengths to be received as the same intended channel by the same receiver. Second, environmental factors, such as temperature, change the wavelength produced by a given laser, so that even identical arrays will not produce close enough wavelengths when the arrays are placed under different ambient conditions.

Conventional WDM systems use stringent manufacturing and environmental control to stay within tolerance. The conventional approach is to precisely fine-tune transmitters and receivers in the production process, which is expensive both in time and hardware, and to control the physical environment of the transmitters during operation with elaborate feedback systems.

For distributed systems, the situation is even more complicated because each receiver component has to demultiplex signals from different transmitters and from different fiber lines, all of which independently operate under different and changing environmental conditions. The individual transmitters have manufacturing variations resulting in spectral distortions that are extremely difficult to control. Furthermore, for fiber optic systems working in harsh environmental conditions, such as in aerospace systems, the sensor/actuators and the associated transmitters/receivers are distributed over the aircraft/spacecraft. Different locations from the engine to the wings are subjected to extreme temperature differences, vibrations, mechanical stress, shock, and pressure variations. These factors can cause large deviations from the design wavelength spectra. Thus the receiver will not receive a precisely controlled spectrum, but instead one that is inevitably subjected to sizable time-dependent wavelength distortions.

FIG. 1 shows a typical spectrum of an optical data stream. At time $t_0$ the bits of data appear at their assigned wavelengths $\lambda_0$ to $\lambda_n$, as shown on plot 10. With time (as shown at $t_1$ on plot 11 and $t_2$ on plot 12) the same data are distorted in absolute position and separation due to environmental influences (such as temperature changes). As mentioned above, the increase of temperature of only 1 degree C. can lead to a wavelength shift of about 0.5–1 nm. This drift results in wavelength variations of around 0.1%, which is too high for a dense WDM system operating with fixed and predefined wavelength channels. Under some conditions, shifts resulting from small changes in temperature can exceed the width of the whole operating wavelength spectrum.

Until now, efforts to make optical WDM systems practical have centered on improving the wavelength stability of the transmitter lasers. This approach is difficult and expensive, and in varying environmental conditions may not even possible. A need remains in the art for an optical WDM receiver which can adjust to wavelength variations in the received optical data both from differing transmitters and from the same transmitter over time.

SUMMARY OF THE INVENTION

An object of the present invention is to provide an optical transmitter and receiver system suitable for wavelength division multiplexing (WDM) which is able to tolerate shifts in the transmitting laser's wavelength.

An optical WDM receiver adjusts to wavelength variations in the input data by detecting and adjusting for these variations dynamically. The receiver uses a technique which can adapt rapidly to wavelength distortions. This is achieved while decoding the optical input over the entire operating wavelength range of the transmission system.

The operation of the WDM adaptive transceiver is as follows. The system uses a Robust-WDM Communication Protocol in order to transfer data using wavelength division multiplexing. During a periodically repeated wavelength synchronization phase, only a single transmitter laser is operating, and the peak finder, preferably a Winner Take All (WTA) device, locks onto the wavelength having greatest power and notes the corresponding detector pixel's position. Thus, the receiver knows the relative wavelength of the transmitting laser in terms of the detector pixel illuminated with the brightest light, and can store this information for later reference. The transmitter lasers take turns synchronizing their wavelengths during successive synchronization phases.

During the multi-wavelength data transmission phase, many lasers in the system transmit information at the same time, albeit on different wavelengths. During this phase, each receiver decodes the input from one or a few selected pixels identified previously during the synchronization phase as being associated with a particular selected transmitter (ignoring power from unselected transmitters).

The optical signal coming into each receiver via the fiber is spectrally decomposed by a dispersion system and imaged onto an oversampled array of photodetectors. The detector array converts optical power into analog electrical signals. These signals are then fed into two components, a Winner-Take-All (WTA) device and a selector. When requested, the WTA very rapidly determines the detector receiving the brightest signal. The WTA then passes on this information to the system controller via control signal lines. The controller stores the position index of the pixel at the brightest wavelength in a lookup table for later reference. By means of the lookup table, the controller keeps track of the wavelength of each transmitting laser in the system relevant to its receiver. It also generates appropriate control signals for the selector and sets the corresponding data paths in the selector.

As described above, the incoming data is also routed from the detector array to a selector. The selector acts as a crossbar switching network. Depending on the settings of the control signals from the controller, the signals from one or several receiver pixels are routed through the selector to a quantizer and then to a buffer. The quantizer converts the analog output currents of the photodetector array into digital signals suitable for further processing. The data is then stored in the buffer, where it waits to be picked up by the host. The host communicates with the buffer via the control signals and reads the data via the data signals. The quantizer also extracts timing information from the received signal if required.

An adaptive optical receiver according to the present invention comprises means for receiving optical signals including a monochromatic synchronization signal and a transmission signal, means for dynamically determining relative wavelength of the synchronization signal, and means for selectively accepting only portions of the transmission signal having wavelengths corresponding to said relative wavelength of said synchronization signal.

The determining means includes an array of optical detectors, means for spectrally decomposing the synchronization signal across the array, and means connected to the array for ascertaining which of the detectors has received the highest intensity optical signal. The ascertaining means comprises a winner take all (WTA) unit, the WTA further including means for generating a winner signal representing which detector received the highest intensity optical signal. The means for selectively accepting includes a selector circuit for selecting which detector to accept signals from and a controller connected to the WTA for storing the winner signal and for controlling which detector signal the selector circuit accepts based upon the winner signal.

More specifically, an adaptive optical receiver according to the present invention for receiving optical signals including a monochromatic synchronization signal and a transmission signal, from an optical medium and for selectively transmitting these optical signals to a host comprises a detector array for converting light into electrical signals, the electrical signal from each detector of the detector array being proportional to the intensity of light impinging upon that detector, a dispersion system connected to the optical medium for spectrally decomposing the optical signals from the medium and imaging them onto the detector array, peak finding means connected to the detector array for receiving the electrical signals from the detector array while the synchronization signal is being received and for generating a winner signal for indicating which detector received the highest intensity of light, thereby indicating the relative wavelength of the synchronization signal, selector circuitry connected to the detector array for receiving the electrical signals and selecting which electrical signals to transmit to the host, and a controller responsive to the host and to the peak finding means for generating a select signal to control the select circuitry such that the select circuitry selects a detector corresponding to a transmission signal at the synchronization signal wavelength.

The controller includes a lookup table for storing relative frequencies of a plurality of synchronization signals generated by a plurality of transmitters. The select circuit is capable of selecting a plurality of detectors in order to accept more than one transmission signal. The peak finder means is a winner take all unit. The dispersion system may be a Rowland circle, a phased array, or an optical grating.

In the environment of an optical wavelength division multiplexing network having a plurality of receivers and transmitters connected to hosts and connected to a shared medium, an improved receiver according to the present invention comprises means for receiving optical signals from the shared medium, the optical signals including a monochromatic synchronization signal and a transmission signal, means for dynamically determining relative wavelength of said synchronization signal, and means for selectively passing to a connected one of said hosts only portions of the transmission signal having wavelengths corresponding to the relative wavelength of the synchronization signal.

Each transmitter transmits a synchronization signal at a specific wavelength at a predetermined time, and the wavelength of the synchronization signal from each transmitter matches the wavelength of subsequent transmission signals from that transmitter. The receiver further includes means for storing the relative wavelength of each synchronization signal. The means for selectively passing includes means for using the stored relative wavelengths to select which transmitter frequencies to pass.

A method according to the present invention of adaptively receiving optical signals, including synchronization signals and transmission signals, from a plurality of transmitters transmitting at unpredictable and shifting wavelengths, and selectively passing said transmission signals to a host, comprises the steps of receiving synchronization signals from the transmitters at predetermined times, dynamically determining the relative wavelength of the synchronization signals, receiving transmission signals from the transmitters, and selectively passing to the host only transmission signals having wavelengths corresponding to the wavelengths of one or more synchronization signals.

The determining step includes the steps of spectrally decomposing each of the synchronization signals over an array of optical detectors, and ascertaining which detector has received the highest intensity of light for each synchronization signal. The ascertaining step is performed by a Winner Take All (WTA) unit and includes the step of producing a winner signal which indicates which detector received the highest intensity of light. The step of selectively accepting includes the step of controlling which detector signal the selector circuit accepts based upon the winner signal.

The ascertaining step includes the step of storing a lookup table of relative frequencies of a plurality of synchronization signals generated by a plurality of transmitters. The selectively accepting step is capable of selecting a plurality of detectors in order to accept more than one transmission signal.

Those having normal skill in the art will recognize the foregoing and other objects, features, advantages and applications of the present invention from the following more detailed description of the preferred embodiments as illustrated in the accompanying drawings.

DETAILED DESCRIPTION

Figure 1:
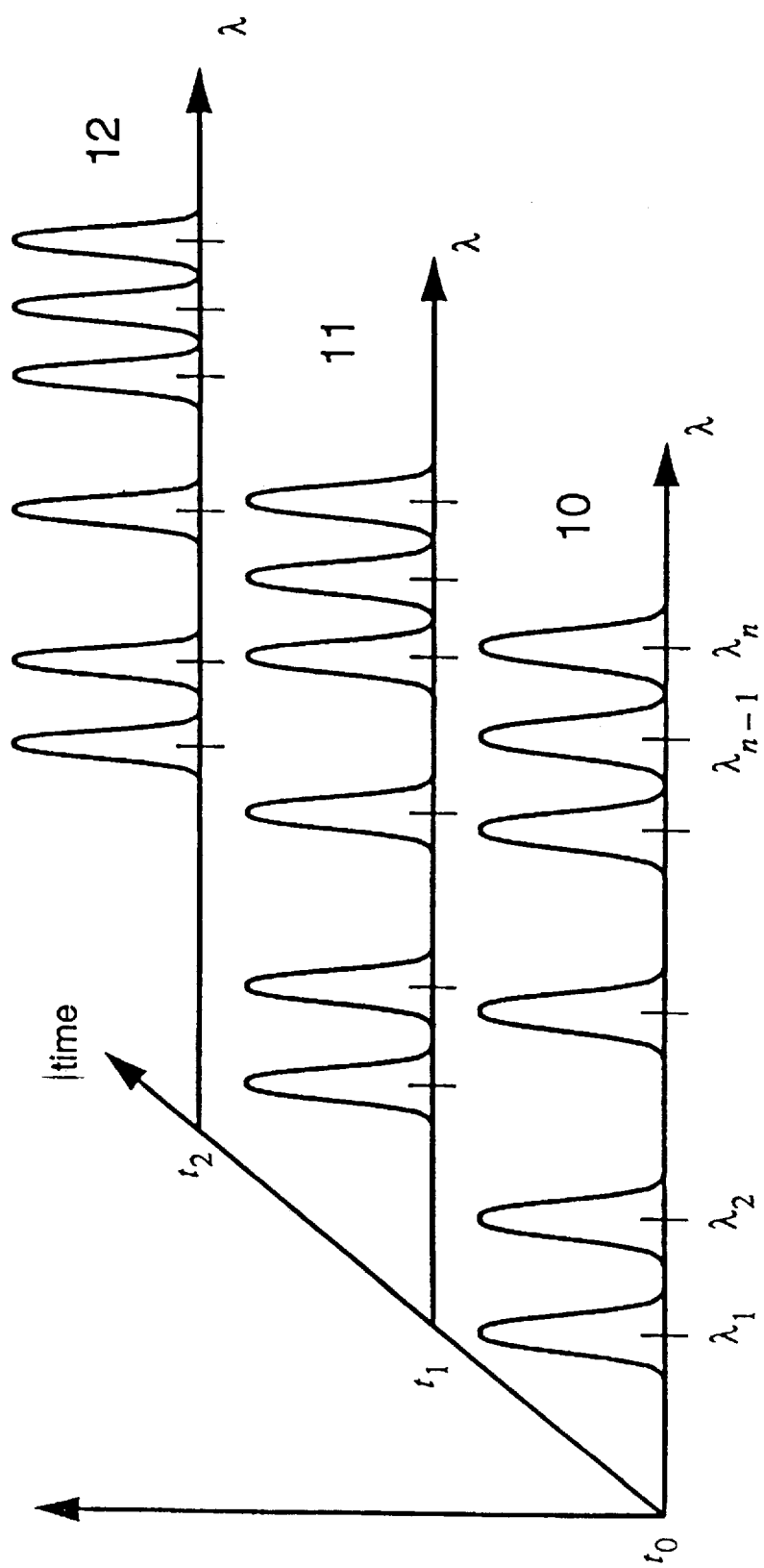
FIG. 1 shows qualitative changes of the optical power spectrum over time in a conventional WDM system.
Figure 2:
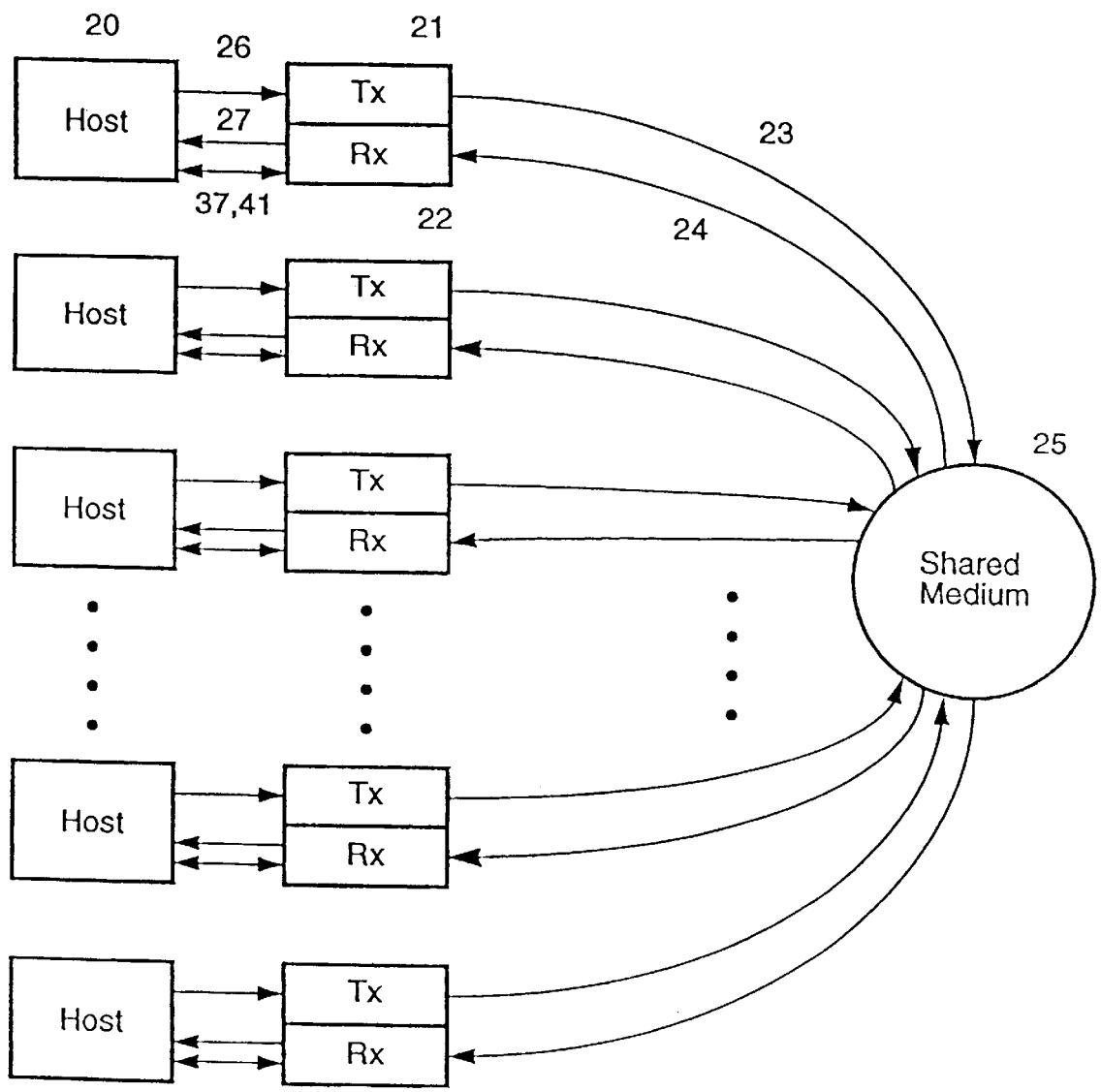
FIG. 2 shows a generic WDM network.

FIG. 2 shows a WDM system in which two or more hosts 20 communicate with each other by exchanging information through transmitters 21, receivers 22 and shared medium 25. Shared medium 25 is a network of optical fibers that connects all transmitters 21 and receivers 22 together. Each transmitter 21 sends data through its outgoing fiber 23. Each receiver 22 receives data through its incoming fiber 24.

Hosts 20 are attached to their transmitters 21 and receivers 22 with appropriate buses 26, 27 containing the necessary data signals and buses 37 and 41 containing the control signals. One transmitter 21 can talk to many receivers 22, including its host receiver. One receiver 22 can receive data from several transmitters 21 simultaneously, including its host transmitter.

In the preferred embodiment, the network architecture is a passive star topology as shown in FIG. 2, but many other architectures and topologies employing optical WDM are feasible, any of which could make use of the robust receiver described herein. For example, a special case of the passive star is the point-to-point connection, where only two hosts communicate with each other.

In the preferred embodiment, hosts 20 are computers. However, the Robust-WDM System is flexible enough to accommodate many other types of hosts including peripherals of computer systems (printers, disk drives, scanners), nodes in a computer network, communication devices (telephones, faxes, video phones), nodes in a television broadcasting system (optical cable TV transmitters and receivers), video servers and TV receivers in video-on-demand systems, and nodes in an interactive television network.

Figure 3:
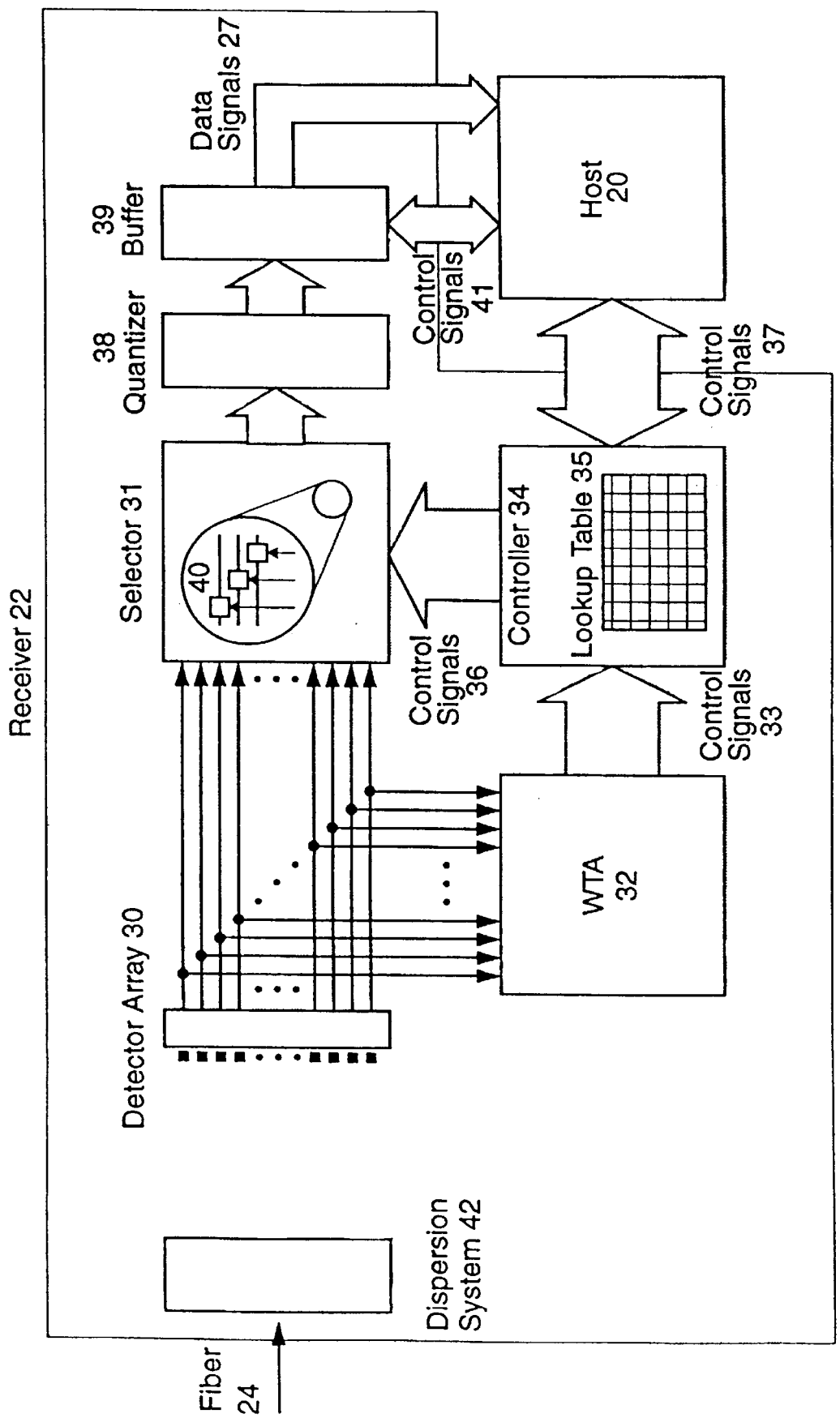
FIG. 3 shows the main components of the Robust-WDM receiver hardware in accordance with the present invention.

FIG. 3 shows the hardware components of WDM receiver 22 in more detail. Receiver 22 can logically be separated into several different elements. Dispersion system 42 is connected to incoming fiber 24. Dispersion system 42 could be a simple prism, an optical grating, a Rowland circle, or a phased array. Dispersion system 42 spreads the incoming optical power across an array of photodetectors 30. There is a monotonic relationship between the spectral position of a given photonic signal and the position of the photodetectors upon which dispersion system 42 images the photonic signal. In the preferred embodiment, the spectral resolution of this device is on the order of 0.5 nm or better, which can easily be achieved. The technical specification of photodetector array 30 is mainly determined by the wavelength of the lasers 49.

In the preferred embodiment, i.e., in the 0.8 micron wavelength range used in short range local area networks, the detector can be fabricated of PIN diodes with standard silicon technology. For the longer wavelength ranges from 1.3 microns to 1.5 microns, the detector can be fabricated with InGaAs technology. Since the spectral bandwidth of optical amplifiers, e.g. Erbium doped fibers (EDF) or semiconductor optical amplifiers (SOA) is of the order of 20 nm and the spectral resolution of the dispersion system is about 0.5 nm, the over-sampled detector array should have at least 40 elements.

Winner Take All unit (WTA) 32 receives electronic signals from each detector element of array 30 in parallel and finds the pixel generating the greatest current, resulting from the brightest illumination (shown in FIG. 6, 73 and 74). Thus, the wavelength information is transformed into position information. In the preferred embodiment, the WTA is implemented in fast VLSI circuitry. As much of the data can be processed in parallel, the peak-finding process can be as fast as a few nanoseconds.

The position index is then correlated with the known currently transmitting laser 49 (shown in FIGS. 4 and 6), and the corresponding pair of indices are cached in controller 34's lookup table 35 for later use if the receiver is to decode data from that transmitter. During the multi-wavelength data transmission phase (61 in FIG. 5, 71 in FIG. 6), selector 31, programmed by controller 34 via control signals 36, routes the current from the appropriate transmitter's pixel and, optionally, its nearest neighbors, to a quantizing circuit 38. Timing recovery is also performed in quantizer 38 and timing information is made available as one of control signals 41.

While data is transmitted, during the multi-wavelength data transmission phase (61, 71), data from only one (or a few) transmitters is decoded by each receiver 22 while data from the other transmitters is ignored. The receiver is able to switch electronically between transmitters in a few nanoseconds by selecting the appropriate enable lines 40 at selector 31. Selector 31 is essentially a switching crossbar that routes the appropriate currents from the detector array pixels to quantizer 38. The output signals of detector array 30 are fed into selector 31. Selector 31 has an enable line 40 for each of the detector pixel's output signal. Depending on the status of each enable line 40, a pixel's output is either accepted and routed through to quantizer 38 or blocked. Quantizer 38 may convert the analog output currents of as many detector pixels as desired. During the synchronization phase of the Robust-WDM Communication Protocol (60, 70), WTA 32 detects the brightest pixel in detector array 30 and notifies controller 34 of its position within the receiver array. Thus, the relative wavelength of each laser in the system is stored in controller 34's lookup table 35 in terms of its position in receiver array 30. During the multi-wavelength data transmission phase (61, 71), controller 34 enables the appropriate transmitter's laser's signal 49 by selecting a single pixel (and, optionally, its nearest neighbors) enable line 40 in selector 31. This pixel's signal is then passed on to quantizer 38.

Controller 34 constitutes much of the interface between host 20 and Robust-WDM receiver 22. It communicates with host 20 via control signals 37 and notifies host 20 of the receiver hardware status. In particular, controller 34 maintains lookup table 35 in which the relative wavelengths of all lasers 49 in the system are stored in terms of their spatial positions in detector array 30. During the synchronization phase (60, 70), when only one single laser 49 in the system is turned is on, WTA 32 rapidly finds the receiver array pixel with the highest illumination (73, 74) and sends this information to controller 34 via control lines 33 for storage in lookup table 35.

During the multi-wavelength data transmission phase (61, 71), lookup table 35 is used to select the pixels associated with transmitters from which this receiver intends to receive data. Controller 34 selects the appropriate receiver pixel by transmitting a specific control signal to selector 31.

Quantizer 38 converts the analog electrical output signal (s) of the currently selected receiver pixel(s) into a digital signal. This digital signal is a single stream of bits which, in the preferred embodiment, is then converted into larger data blocks. However, once a bit stream is obtained, there is no restriction on the kind of information which can be transported with the present invention. A suitable block size can be chosen according to the desired application. The block size is dependent on the type of host connected to this particular receiver. In the preferred embodiment, a block is 32 or 64 bits wide, making it suitable for further processing with contemporary computers. Many other block sizes are feasible, in particular 8, 16 or 128 bits, which are all suitable for transfer from and to computers. Block sizes often used in communication systems are 53 bytes (for ATM systems) and 320 bits.

Once a block is complete, it is placed into buffer 39 where it can be picked up by host 20. Control signal lines 41 ensure proper handshaking between buffer 39 and host 20 and the data is transferred via data signals 27.

In the preferred embodiment, dispersion system 42 with its connections to fiber 24 and photodetector array 30 will be integrated in the same package of a very compact and mechanically robust design. This will avoid optical problems with misalignment, caused, for example, by vibration.

Receiver 22 is designed to be used with WDM systems operating in the 1.3–1.5 micron range and in the 0.8 micron range. The only hardware elements which vary between receivers used in these two ranges are detector array 30 and dispersion system 42. Detector array 30 must be chosen to detect the appropriate wavelengths, and dispersion system 42 must be chosen and/or oriented to properly spread the input light over array 30. All of the electronic elements of receiver 22 are wavelength independent, and would, in the preferred embodiment, be placed into a single package which is plug compatible with the optical elements chosen according to wavelength. Typically, short haul applications would utilize 0.8 micron wavelengths, and long haul applications would use 1.3 to 1.5 micron wavelengths.

WTA 32, along with the integrated switching crossbar selector 31 and low level control logic (provided by controller 34 and lookup table 35) will also be integrated on a single VLSI chip in the preferred embodiment. Integrating the transceiver module will allow high-speed operation. The advantages of using this particular design approach are the following. No external circuitry is necessary. Systems will operate at high speed, with as few as three additional clock cycles necessary beyond a traditional receiver. The system can operate in different wavelength ranges with relatively minor changes.

Figure 4:
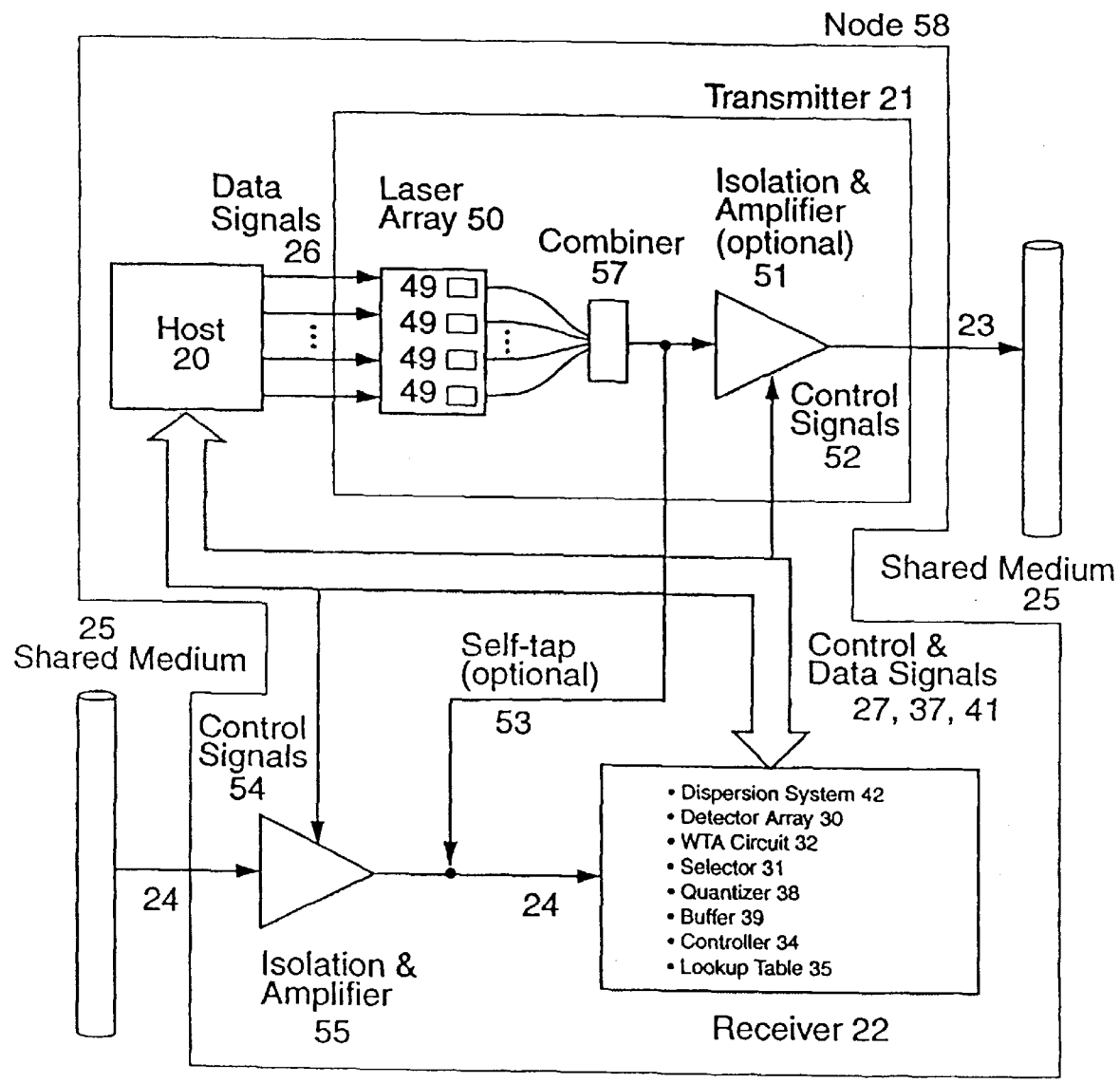
FIG. 4 shows the main components of the Robust-WDM node (transceiver) hardware in accordance with the present invention.

FIG. 4 shows all of the hardware within each node or transceiver 58. The process of sending information from a node 58 into the network is as follows. Host 20 sends information via control and data signal lines 26 to buffers (not shown) and driver circuitry (not shown) which modulate one or more lasers 49 within laser array 50. The laser's optical signal is fed into a combiner 57. This combined signal is then fed into the shared fiber medium 25 via an optional amplifier 51 and the outgoing fiber 23. A small fraction of the combined signal can also be fed back to the node's receiver circuitry (through self-tap link 53) in order to enable the node to do a self test to check its own lasers' wavelengths, should this be required by some advanced protocols. When self testing, the node isolates itself by blocking any signals from or to the network using the dedicated amplifier control lines 52 and 54. Providing a specific signal to amplifiers 51 and 55 causes them to go into isolation. In effect, an isolated node becomes opaque, blocking all light coming in through fiber 24.

The process of receiving information from the network is as follows. Incoming data arrives through fiber 24 and isolation & amplifier circuitry 55 and is read by receiver hardware 22. Receiver hardware 22 is shown in FIG. 3. Receivers 22 select which lasers 49 to accept as shown in FIG. 3.

WTA 32 finds the pixel of the detector array with the highest level of illumination. The name "Winner Take All" derives from the fact that WTA 32 determines the one signal with the highest input level ("the winner signal") among all of the inputs. In the preferred embodiment, WTA 32 is implemented in hardware as described in the following papers authored or co-authored by the inventors of the present invention. "Optical Winner-Take-All Circuits using PNPN Photothyristors" by Pankove et al., Electron Lett. 26, 350, 1990. Maximum detection with a 2D optoelectronic pnpn Winner-Takes-All network" by Radehaus et al., Applied Optics 31, 6303–6306, 1992. "Technical Applications of a 2D Optoelectronic P-N-P-N Winner-Take-All Array" by Radehaus et al., Proceedings of Physics, New York, 1995. The implementation described in these papers has the characteristics described below.

Over an array of n elements, the WTA function at the point $x_i$ (where $0 \leq i \leq n-1$) can be computed as follows:

$$WTA(X_i) = \frac{\alpha e^{\beta X_i}}{\sum_{j=0}^{n-1} e^{\beta X_j}}$$

where $\alpha$ is the amplification factor and $\beta$ is the peak separation. Note, however, that many other possible WTA-functions exist.

This WTA circuit is based entirely on analog circuitry, and thus is able to find the peak signal from among its inputs very quickly. However, any unit that finds the peak among its input signals can function as WTA 32 in the present invention. For example, a combination of analog shift registers, sample and hold circuits, and analog comparators could be used. Or, A/D conversion of each signal could be performed, and digital shift registers and comparators could be used. A software implementation of WTA 32 would be A/D conversion, followed by use of a fast digital signal processor. A neural network could also be used.

Figure 5:
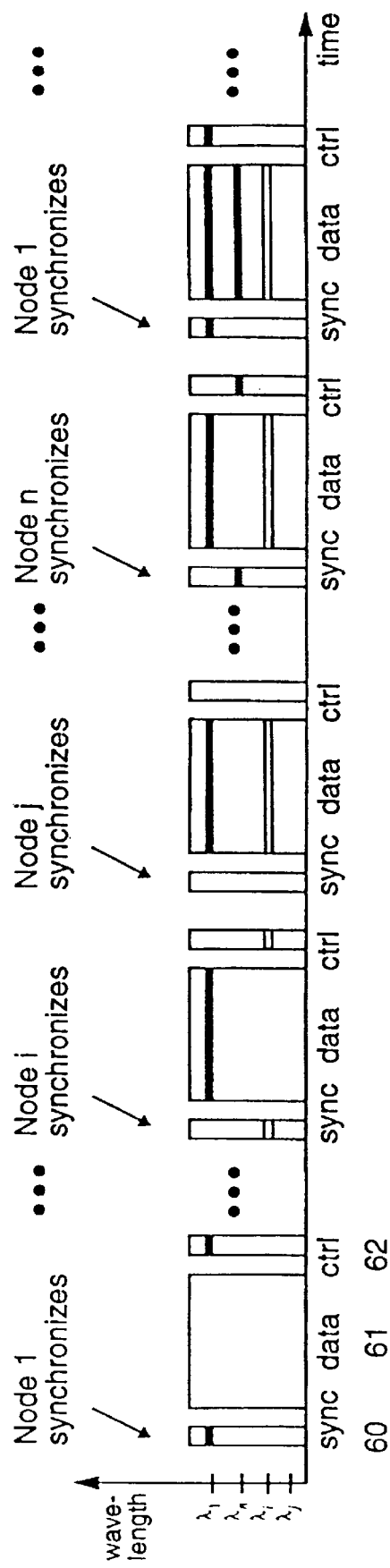
FIG. 5 shows the Robust-WDM Protocol.

The Robust-WDM Communication Protocol shown in FIG. 5 allows wavelength synchronization between transmitters 21 and receivers 22 as well as data transmission after synchronization has taken place. The protocol consists of three phases, a short synchronization phase 60 (70 in FIG. 6), a longer data transmission phase 61 (71 in FIG. 6) and a control phase 62. The purpose of synchronization phase 60 is to periodically resynchronize a transmitter 21/receiver 22 pair's laser wavelength. Data transmission phase 61 allows for simultaneous transmission of data by various transmitters 21. Control phase 62 serves as an information slot for negotiation (known as "call setup") between the network nodes. The node 58 owning a particular synchronization time slot 60 always owns the following control time slot 62, and is the only node which can write into that time slot in order to perform negotiations to do call setup, or to negotiate for use of a wavelength.

Synchronization Phase 60 (70 in FIG. 6) occurs as follows. Each active node 58 (or each active laser 49, if more than one laser per node is active) in the system owns a reserved time slot dedicated to wavelength synchronization 60. Synchronization time slot ownership passes among the nodes in a round-robin fashion. Node 1 (for example) owns the first synchronization time slot and broadcasts a signal in order to let all receivers 22 lock onto its active laser's wavelength. The next synchronization time slot is owned by node 2. Thus, node 2 broadcasts a signal in order to let all receivers 22 locate its active laser's wavelength. Once all of the nodes 58 have synchronized their active lasers, the next synchronization slot will belong to node 1 again for the next round of synchronizations. Thus, drifts in the wavelengths of any of the lasers are detected and accounted for within a short period of time, on the order of a millisecond.

In order to illustrate this concept, assume that node m owns the current synchronization time slot. Then, in order to let node m synchronize the wavelength of the laser it intends to use, all lasers 49 except node m's active laser are quiet. Node m's active laser then broadcasts a single on-bit. Each receiver 22 locks onto node m's active laser wavelength by utilizing WTA 32 on the data read out from the receiver array (as shown in FIG. 6, steps 73 and 74). WTA 32 determines the receiver pixel with the highest spectral intensity. Each receiver 22 stores k's relative wavelength by placing the brightest pixel's bin number into the lookup table 35 of its controller 34. Each receiver 22 can receive data from node m's active laser by reading out the pixel associated with the stored bin number (and optionally from its nearest neighbors) from its photodetector array 30. Every receiver 22 knows the wavelengths of all relevant active lasers in the system. More advanced protocols will utilize this knowledge to employ several lasers 49 in one array 50 simultaneously for communication between nodes.

FIG. 5 illustrates the Robust-WDM Communication Protocol in the time domain by means of an example. The system has just started up, so that none of the nodes has synchronized yet. Node 1 owns the first synchronization slot 60 and the first control slot 62. During first synchronization slot 60, Node 1 chooses one of its lasers to broadcast a signal whose wavelength $\lambda_1$ is recorded by all receivers 22 in the system. During first data transmission phase 61, none of the nodes 58 in the system transmits any data, since none of them have yet negotiated call setup.

A later synchronization time slot 60 and its corresponding control time slot 62 are owned by node i. All receivers lock onto and record the signal from node i at $\lambda_i$, transmitted during this synchronization time slot. Node i cannot begin transmitting during this transmission phase, since it has not yet negotiated call setup. Node 1 (and other nodes which have synchronized and negotiated call setup) can transmit during this time. Node i can transmit during the transmission phase following node j's synchronization, as can node 1 and other nodes which have previously synchronized and negotiated call setup. After the last node, node n, has synchronized and negotiated call setup if desired, node 1 synchronizes again. All of the nodes in the system can transmit during the following data transmission phase, so long as they negotiated call setup during their control phases.

Each transmitter will only use one or a few of the lasers 49 in its array 50 at any one time. Should the wavelength of an active laser 49 drift, due to thermal or other variations, and come too close to another active laser in the system, the affected transmitter will be able to deselect the drifting laser and select another laser having a different wavelength. Alternatively, the transmitter having the drifting laser may request that the transmitter having the laser with the close wavelength deselect the close laser and select another laser from its array 50. This would occur if the laser array 50 of the transmitter 21 with the drifting laser 49 did not have any suitable lasers to select, either because the other lasers 49 in the array 50 are broken or do not have appropriate frequencies.

A data transmission phase 61 (71 in FIG. 6) occurs after each synchronization phase. In the preferred embodiment, the number of bits transmitted during data transmission phase 61 is set at (for example) system startup and remains fixed during the entire duration of the data exchange. Alternatively, an advanced version of the Robust-WDM Protocol can adjust the number of bits transmitted during the data transmission phase 61 depending on the rate at which the lasers' wavelengths drift. For hostile environments, in which large variations in temperature will cause rapid shifts in wavelengths, such an advanced protocol may synchronize the lasers more often when necessary. A longer period between synchronizations, when possible, allows transmission of a larger number of bits during data transmission phase 61.

Control Phase 62 is provided to implement higher level protocols. It is a time slot similar to synchronization phase 60, in that only one laser is active. During control phase 62, the same laser is active as during the preceding synchronization phase 60. All receivers 22 listen to the lasers broadcast during the Control Phase 62. During this time, call setup occurs.

Figure 6A:
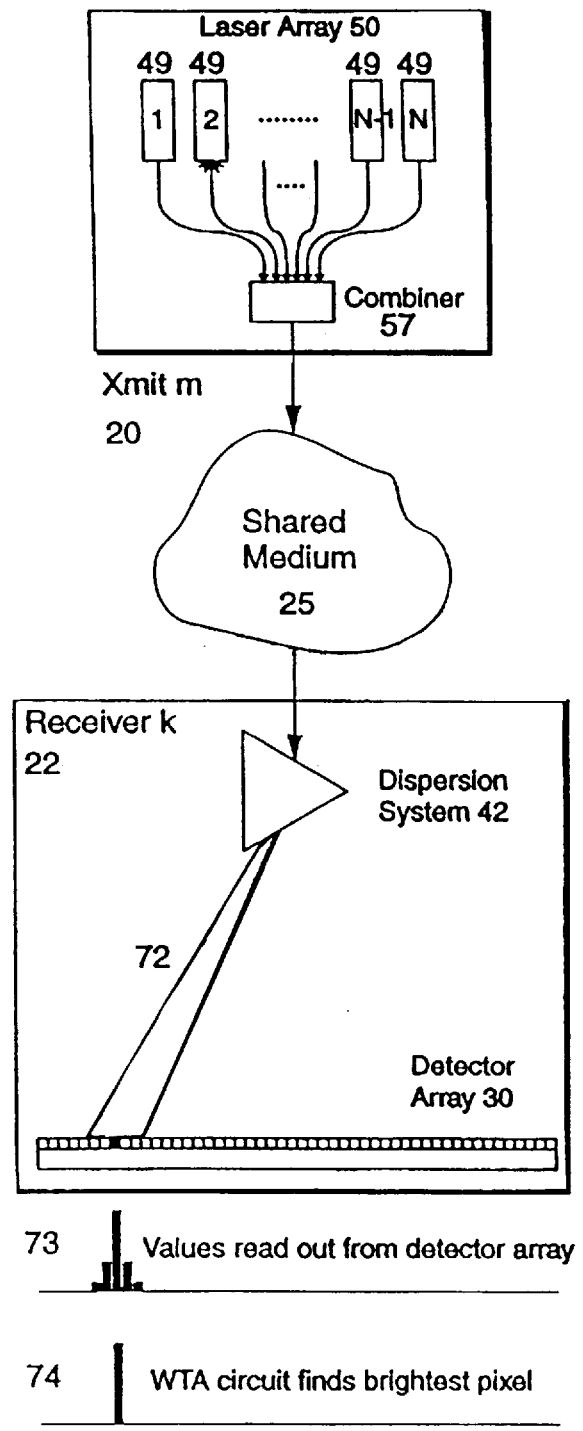
FIG. 6, composed of FIGS. 6A and 6B, shows an example of the synchronization and data transmission phases of Robust-WDM Protocol.
Figure 6B:
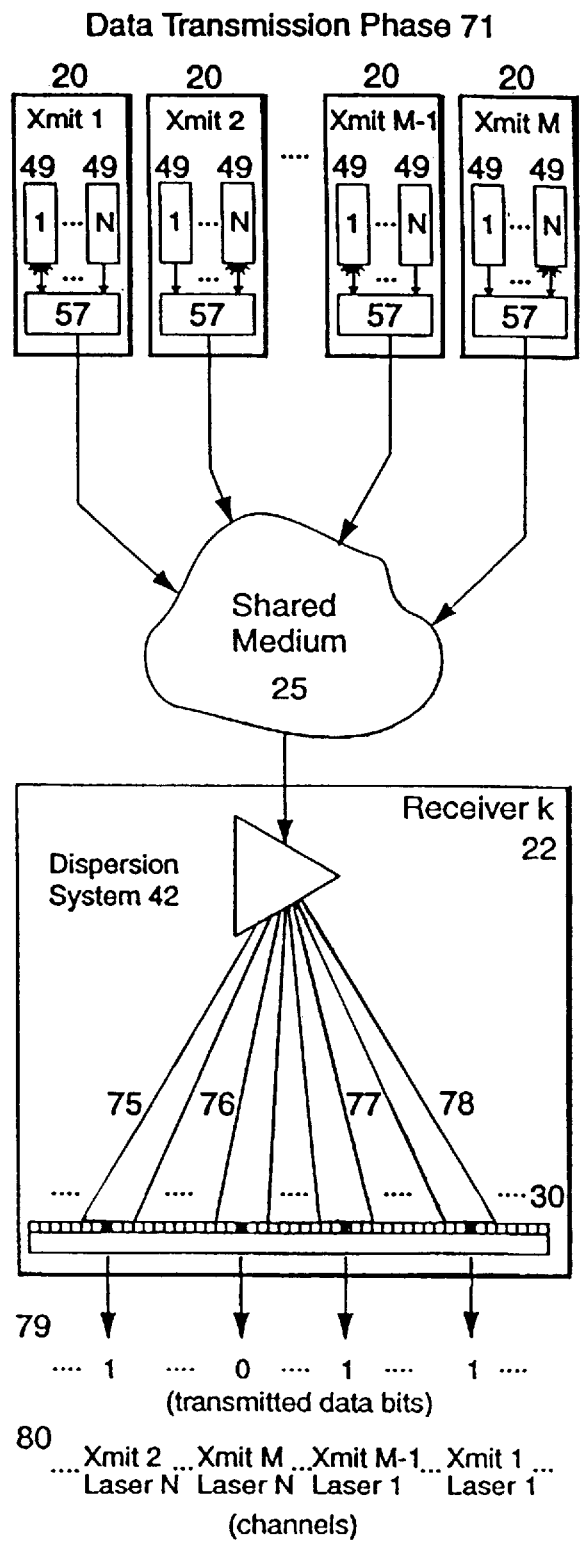

FIG. 6, composed of FIGS. 6A and 6B, shows an example of a WDM system according to the present invention in synchronization phase 70 (shown in FIG. 6A) and data transmission phase 71 (shown in FIG. 6B). In the example of FIG. 6, during synchronization phase 70, laser 2 of transmitter m is active. Dispersion system 42 in receiver k disperses the light from fiber 25, resulting in this laser's light being projected as a beam 72 onto a position within detector array 30 corresponding to this laser's wavelength. Since the light from laser 2 is monochromatic and no other lasers are active only one or a few pixels are illuminated in detector array 30. 73 shows the values read out from detector array 30. 74 shows how WTA 32 has selected the brightest pixel.

In the example of FIG. 6, during transmission phase 71, four lasers from various transmitters are transmitting at four different wavelengths, resulting in four beams of light 75, 76, 77, and 78, emitting from dispersion system 42. Data transmitted 79 is 1 for beams 75, 77, and 78, which are on and 0 for beam 76 which is off. 80 indicates the location of the transmitted data depending on relative wavelength.

Figure 7:
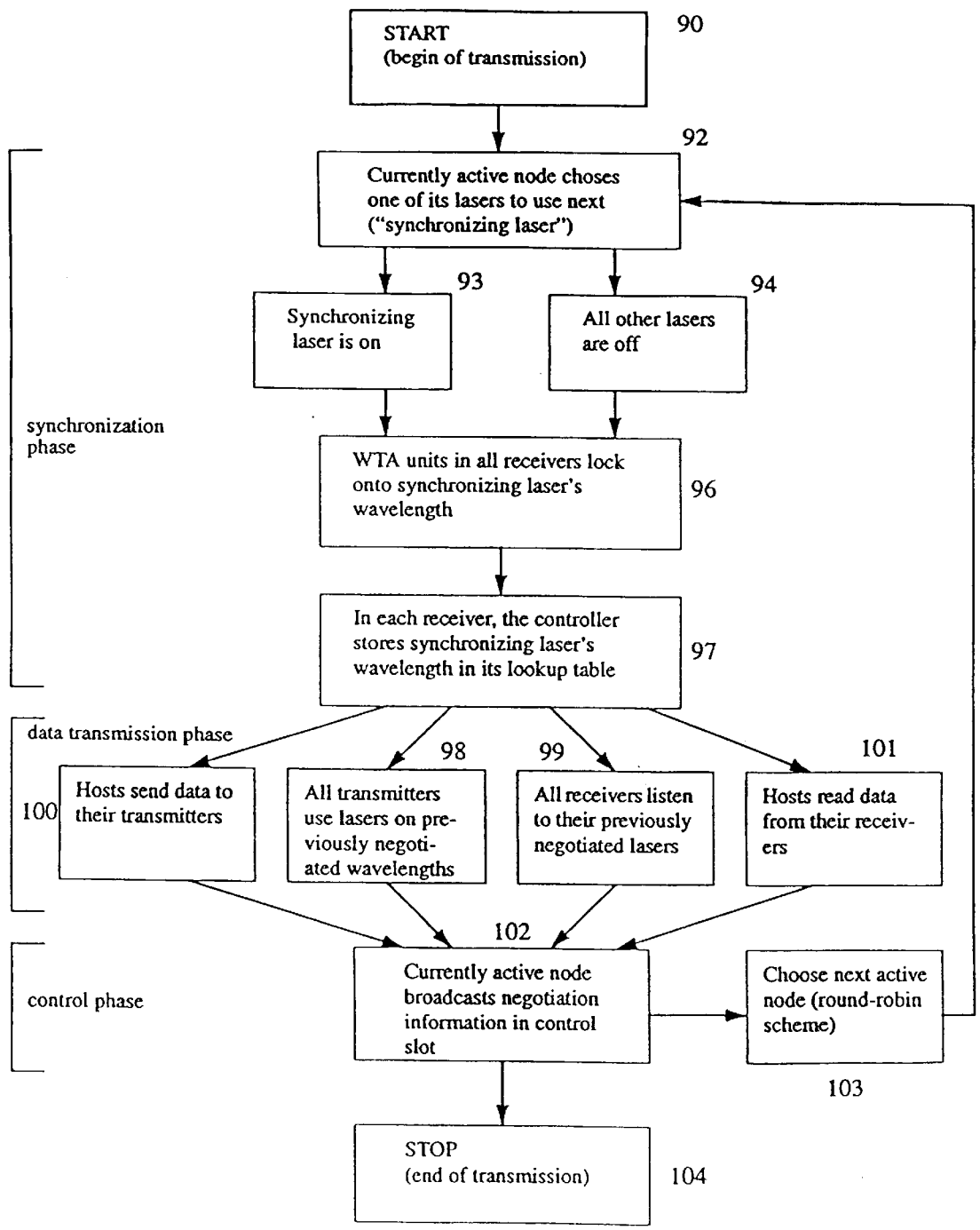
FIG. 7 is a flowchart showing the operation of the WDM transceiver of FIG. 4.

FIG. 7 is a flowchart showing the operation of the WDM transceiver of FIG. 3. Process begins in step 90. Synchronization phase 60 is as follows. In step 92, the currently active node (the node owning the current synchronization time slot 60) chooses one of its lasers 49 out of its laser array 50 to be its active laser. The laser chosen is designated the "synchronizing laser", and is synchronized during the current synchronization time slot. In steps 93 and 94, the synchronizing laser is on and all of the other lasers 49 in the system are off. WTA units 32 in all of the receivers 22 lock onto the synchronizing laser's wavelength in step 96, and all of the controllers 34 store a representation of the synchronizing laser's wavelength in their lookup tables 35 in step 97.

Process continues with data transmission phase 61. All hosts 20 which have negotiated to transmit during this transmission phase send data to their transmitters in step 100. These transmitters 21 use their active lasers to transmit the data in step 98. Concurrently, in step 99, all receivers expecting data listen to the wavelengths which the hosts 20 from which they are expecting data have synchronized. Hosts 20, in turn, receive data from their associated receivers, in step 101.

During control phase 62, step 102, the synchronizing laser broadcasts negotiating information. If transmission is complete, process ends at step 104. Otherwise, the Robust-WDM Communication Protocol chooses the next active node 58 according to the round robin scheme in step 103. Process then loops back to step 92.

While the exemplary preferred embodiment of the present invention is described herein with particularity, those having normal skill in the art will recognize various changes, modifications, additions and applications other than those specifically mentioned herein without departing from the spirit of this invention.

The invention claimed:

1. An adaptive optical receiver comprising:
   means for receiving optical signals, said optical signals including a monochromatic synchronization signal and a transmission signal;
   means for dynamically determining relative wavelength of said synchronization signal, said means for determining including
      means for spectrally decomposing the received synchronization signal,
      means for detecting a location of a highest intensity portion of the decomposed signal and
      means for relating the detected location to a relative frequency of the synchronization signal; and
   means for selectively accepting only portions of said transmission signal having wavelengths corresponding to said relative wavelength of said synchronization signal.

2. The receiver of claim 1 wherein said means for detecting includes:
   an array of optical detectors arranged to intercept the decomposed signal; and
   means connected to the array for ascertaining which of the detectors has received the highest intensity optical signal.

3. The receiver of claim 2 wherein said ascertaining means comprises a winner take all (WTA) unit, said WTA further including means for generating a winner signal representing which detector received the highest intensity optical signal.

4. The receiver of claim 3 wherein said means for selectively accepting includes:
   a selector circuit for selecting which detector to accept signals from; and
   a controller connected to the WTA for storing the winner signal and for controlling which detector signal the selector circuit accepts based upon the winner signal.

5. An adaptive optical receiver for receiving optical signals, including a monochromatic synchronization signal and a transmission signal, from an optical medium and for selectively transmitting said optical signals to a host, said receiver comprising:
   a detector array for converting light into electrical signals, the electrical signal from each detector of the detector array proportional to the intensity of light impinging upon that detector;
   a dispersion system connected to the optical medium for spectrally decomposing the optical signals from the medium and imaging them onto the detector array;
   peak finding means connected to the detector array for receiving the electrical signals from the detector array while the synchronization signal is being received and for generating a winner signal, said winner signal for indicating which detector received the highest intensity of light, thereby indicating the relative wavelength of the synchronization signal;
   selector circuitry connected to the detector array for receiving the electrical signals and selecting which electrical signals to transmit to the host; and
   a controller responsive to the host and to the peak finding means for generating a select signal to control the select circuitry such that said select circuitry selects a detector corresponding to a transmission signal at the synchronization signal wavelength.

6. The receiver of claim 5, wherein said controller includes a lookup table for storing relative frequencies of a plurality of synchronization signals generated by a plurality of transmitters.

7. The receiver of claim 6, wherein the select circuit is capable of selecting a plurality of detectors in order to accept more than one transmission signal.

8. The receiver of claim 5 wherein said peak finder means is a winner take all unit.

9. The receiver of claim 5 wherein said dispersion system is a Rowland circle.

10. The receiver of claim 5 wherein said dispersion system is a phased array.

11. The receiver of claim 5 wherein said dispersion system is an optical grating.

12. In an optical wavelength division multiplexing network having a plurality of receivers and transmitters connected to hosts and connected to a shared medium, an improved receiver comprising:
   means for receiving optical signals from the shared medium, said optical signals including a monochromatic synchronization signal and a transmission signal;
   means for dynamically determining relative wavelength of said synchronization signal, said means for determining including
      means for spectrally decomposing the received synchronization signal,
      means for detecting a location of a highest intensity portion of the decomposed signal and
      means for relating the detected location to a relative frequency of the synchronization signal; and
   means for selectively passing to a connected one of said hosts only portions of said transmission signal having wavelengths corresponding to said relative wavelength of said synchronization signal.

13. The improved receiver of claim 12 wherein each transmitter transmits a synchronization signal at a specific wavelength at a predetermined time, and the wavelength of the synchronization signal from each transmitter matches the wavelength of subsequent transmission signals from that transmitter.

14. The improved receiver of claim 13, further including means for storing the relative wavelength of each synchronization signal and wherein the means for selectively passing includes means for using said stored relative wavelengths to select which transmitter frequencies to pass.

15. A method of adaptively receiving optical signals, including synchronization signals and transmission signals, from a plurality of transmitters transmitting at unpredictable and shifting wavelengths, and selectively passing said transmission signals to a host, said method comprising the steps of:

receiving synchronization signals from said transmitters at predetermined times;

dynamically determining the relative wavelengths of the synchronization signals, said step of determining including the steps of spectrally decomposing the received synchronization signals, detecting locations of highest intensity portions of the decomposed signals and relating the detected locations to relative frequencies of the synchronization signals;

receiving transmission signals from said transmitters; and selectively passing to said host only transmission signals having wavelengths corresponding to the wavelengths of one or more synchronization signals.

16. The method of claim 15 wherein the detecting step includes the steps:

intercepting the decomposed signals with an array of optical detectors; and ascertaining which detector has received the highest intensity of light for each synchronization signal.

17. The method of claim 16 wherein the ascertaining step is performed by a Winner Take All (WTA) unit.

18. The method of claim 17 wherein said ascertaining step includes the step of producing a winner signal which indicates which detector received the highest intensity of light.

19. The method of claim 18 wherein said step of selectively accepting includes the step of controlling which detector signal the selector circuit accepts based upon the winner signal.

20. The method of claim 16, wherein said ascertaining step includes the step of storing a lookup table of relative frequencies of a plurality of synchronization signals generated by a plurality of transmitters.

21. The method of claim 16, wherein the selectively accepting step is capable of selecting a plurality of detectors in order to accept more than one transmission signal.

* * * * *